Sept. 7, 1954  O. POSCH  2,688,473
ARRANGEMENT FOR MIXING AND CONVEYING PLASTIC OR THE LIKE
Filed May 5, 1952  3 Sheets-Sheet 1

INVENTOR
OSKAR POSCH
By: Young, Emery & Thompson
Att'ys.

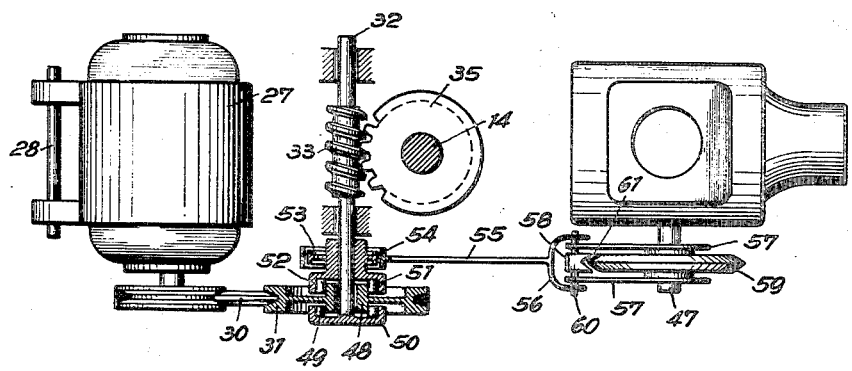
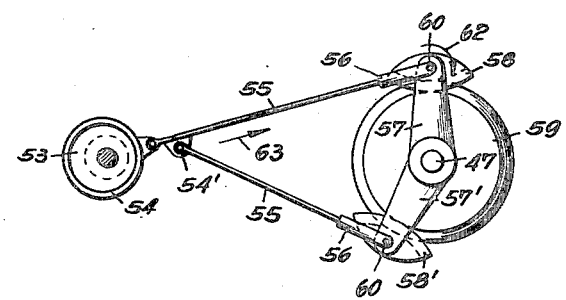
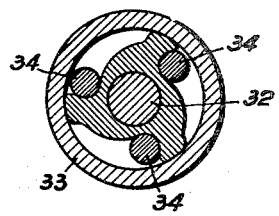
INVENTOR
OSKAR POSCH

INVENTOR:
OSKAR POSCH

Patented Sept. 7, 1954

2,688,473

UNITED STATES PATENT OFFICE 2,688,473

ARRANGEMENT FOR MIXING AND CONVEYING PLASTER OR THE LIKE

Oskar Posch, Schwabisch Gmund, Germany, assignor of one-half to W. u. W. Schenk K. G., Leichtgusswerke, Maulbronn (Wurtt.), Germany Application May 5, 1952, Serial No. 286,079

Claims priority, application Germany May 8, 1951

5 Claims. (Cl. 259—169)

This invention relates to apparatus for mixing and conveying plaster or similar compositions. Combined devices for mixing and conveying or dispensing mixed substances are already well-known in the art. The invention however consists of the combination of a sieve, preferably a vibratory sieve, with a mixing and a conveying arrangement, which is formed by an easily movable unit, which for example may be portable or readily moved from one location to another.

In comparison with a sieve operable outside of the mixing device, the arrangement according to the present invention has the advantage that the material, when it drops from the sieve to the mixer, cannot deteriorate since a long distance of conveyance is not necessary. A further advantage in the present invention is that the material is added to the mixture during the sieving process, that is in small and well distributed quantities. Thus, a faster and more uniform mixture is obtained than is possible when the sieved material is shovelled or otherwise moved into the mixer or into water. In the latter case, lumps are easily formed because the water first enters the outer layer of the substance or materials and forms a sheathing around the interior which can only be dispersed by mechanical means. Consequently, working hours are saved by immediate dispersal from the sieve of the substances to be mixed.

It is therefore an object of the present invention to provide an agitating sieve device which is removable and is in form of a type of cover which is bent in such a way that it may conform with the upper edges of a cylindrical container preferably equipped with handles. A further object of the invention resides in the provision to divide the receptacle by an obliquely-arranged bottom surface or portion which acts as a guide and deflecting plate at the same time and thus forms an upper chamber for mixing and a lower chamber for the driving and conveying mechanisms or units in the container.

In the mixing chamber there is arranged a revolving rod or shaft preferably at an angle relative to the vertical and near the lowest part of the mixing chamber, and which is preferably so mounted in the inclined bottom that a propeller mounted on the shaft revolves a small distance spaced from the bottom. The materials to be mixed will flow toward the lowest part of the bottom surface, and at the lowest point of the mixing chamber the suction entry opening of a delivery pipe is provided which leads to a pump. It is therefore a still further object of the invention to provide an electric motor to drive not only the mixing device but also the pump by means of an intermediate transmission.

It is another object of the invention to operate the machine, that is to alternate the mixing and conveying or that intermittently the machine is mixing but continuously conveying. In the latter case, the space under the mixing chamber is divided into two parts, that is into a supply chamber for the mixed materials which at the same time suitably contains the drive for rotating the shaft, and a space under the supply chamber which contains the pump and its drive. The storing effect of the supply chamber allows continuous operation while the supply chamber is intermittently fed from the mixing chamber.

At the end of a hose attached to the exit end of the pump, an adjustable nozzle is provided having a revolving wheel for feeding the conveyed material. The said wheel is suitably driven by a separate electric motor if desired which should preferably be easily removable.

Further features of the invention will be obvious from the folowing description when considered in connection with the accompanying drawings in which:

Fig. 3 is a cross section of a detail on an enlarged scale,

Fig. 4 is a top plan view of a modified construction of the drive with various parts in section, Fig. 5 is a side view of a detail of Fig. 4.

Figure 1:
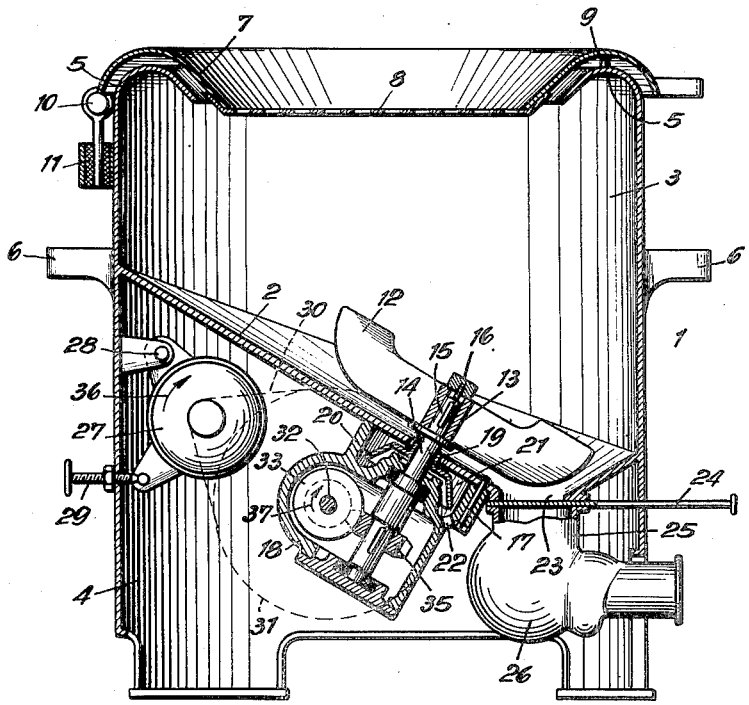
Fig. 1 is a vertical section through the first form of construction.
Figure 2:
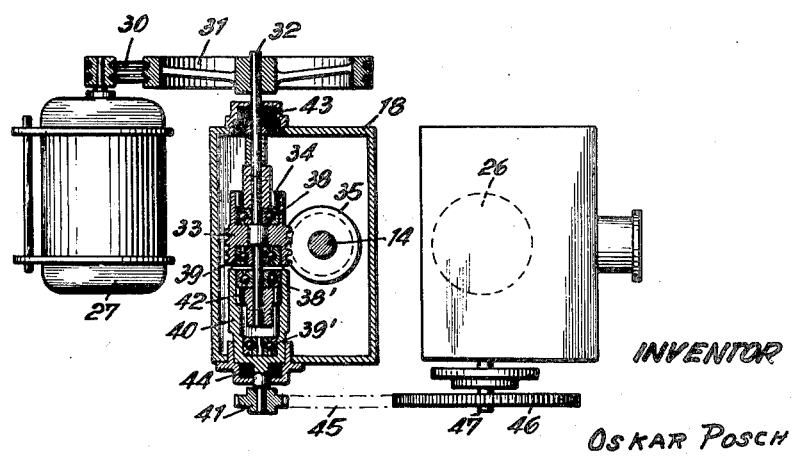
Fig. 2 is a plan view of the drive of Fig. 1 with parts in section.

According to the example of Figs. 1 and 2 an essentially cylindrical, preferably welded plate and container body or casing 1 is provided having an outer smooth and plain surface in order that it may be easily cleaned. The interior space is divided by an inclined bottom member 2 preferably welded to the internal sides of the casing 1 and dividing the latter into an upper mixing chamber 3 and a lower drive chamber 4. The top edge or rim 5 of the casing 1 is bent inwardly and downwardly and is circular in cross section. By this bent portion 5 and the welded stiffening bottom member 2, the casing 1 is very rigid, even if manufactured only of thin iron plate which ensures low weight. In consequence of the rigidity of the main casing it is possible to secure handles 6 on its external surface which are preferably welded thereto.

The structure further includes a sieve 8 which is provided adjacent the top edge of the casing 1 and is bent up to form hinges held in rubber blocks. The top member consists of an annular frame 7 to which is secured the sieve 8, the frame 7 overlapping the round top edge or rim 5 of the casing 1. The sieve frame 7 rests on one side, at the right of Fig. 1, on a projection 9 secured to the top edge 5 of casing 1, and on the left hand side, Fig. 1, on a ball 10 of a preferably electromagnetic agitating device 11.

In the mixing chamber 3 and near the lowest point of its inclined bottom member 2, there are mounted in bearings revolving mixing propeller blades 12. The propeller blades 12 are welded to a hub 13 which is secured on a shaft 14 by means of a key 15 and is held in place on the shaft by a nut 16 against axial dislocation. On the lower side of the bottom member 2 there is secured a gear box 18 by means of a bolt 17, which at the same time is adapted to receive the bearings in which the shaft 14 rotates. At the point of passage of shaft 14 through the bottom member 2, there is provided a seal 19 to which is secured a gasket 20, whereby the latter leads any fluid penetrating through the bearing into an annular space 21 which has holes 22 therein through which any water may flow.

At the lowest point of the mixing chamber 3 there is provided an exit 23 through the bottom member which can be closed by a slide valve 24. Flanged to the exit 23 is the suction pipe 25 which forms a part of a conveying pump 26 which is preferably a pump having a rotary piston, the specific form of which does not affect the present invention. The mixing propeller 12 and the pump 26 are driven by an electric motor 27, which latter is fastened in bearings revolving around an axis or rod 28 on the internal wall of the casing 1.

By means of an adjustable bolt 29 projecting through the wall of the casing 1, the inclination of the motor may be adjusted around the axis 28, and thereby the tension on a V-belt drive 30 may be adjusted. By means of the V-belt 30 a wheel 31 is driven which is fixed on a shaft 32 mounted in bearings in the box 18. A worm gear 33 is also secured on the shaft 32 through a free wheel lock gear 34 of known type, Fig. 3. The worm gear 33 interlocks with a worm gear 35 keyed on the shaft 14. When the motor 27 is running in the direction of the arrow 36, Fig. 1, the shaft 32 is driven in the direction of the arrow 37, and the friction gear 34 is thus driving the worm gear 33, so that the worm gear 35 and therewith the propeller 12 is set into rotation. The worm gear 33 is held on the shaft 32 by means of ball bearings 38 and 39. By means of ball bearings 38' and 39', Fig. 2, a shell or sleeve 40 is held on the shaft 32 on which a sprocket wheel 41 is fastened. Between the sleeve 40 and the shaft 32 there is provided a further free wheel lock gear 42, corresponding to the gear 34, but effective in the opposite direction. The parts of the gear mentioned in the foregoing are enclosed in the gear box 18 which is oil proof and the shaft 32 is secured against leakage of oil by means of an oil retainer ring 43 with the oil retaining ring 44 provided for the sleeve 40. The gear box 18 is at least partly filled with oil whereby the bearings are not completely under the oil level but are sufficiently lubricated by the oil which is thrown around in the box by the worm gears. From the sprocket wheel 41, a chain 45 drives a second sprocket wheel 46 which is fixed on a shaft 47 of the pump 26.

If the motor 36 is running in the direction opposite to the arrow 36 the gear 34 is free as to its connection between the shaft 32 and the worm gear 33, and the worm gear 35 is then no longer driven so that the propeller 12 comes to a standstill. When however the lock gear 42 which so far did not lock with the sleeve 40 is taking the sleeve with it, the sprocket wheel 41 and thereby the pump 26 are driven. From the same motor the pump is driven in one direction of rotation of the motor shaft but the propeller is driven in the other direction of the motor.

Alternative constructions are achieved when, between the shaft 32 and the pump shaft 47, another gear box is interposed. Both shafts could for instance be provided with several chain or sprocket wheels or gears in order to change the speed of the pump by changing the chain wheels, but the rotational speed of the propeller 12 remains the same.

With the example of Figs. 4 and 5 a speed variation is achieved for instance of the friction latch type with shift levers, interposed between the driving wheel or pulley 31, which is driven by the V-belt 30 from the motor 27, and the pump shaft 47. The worm gear 33 is fixed on the shaft 32, but the wheel 31 with its hub 48 is freely rotatable on the shaft 32. This hub 48 simultaneously forms the inner member of two free wheel lock members corresponding to the lock members 34 and 42 of Fig. 2. To the one lock, the rollers 49 are provided which exert their pressure on the inner surface of a rim casing 50 which is fastened on the shaft 32. The members of the other lock are the rollers 51 which press on the inner mantle of a rim casing 52 held on the shaft 32 and carrying a cam or eccentric 53.

According to the direction or rotation of the motor and the driving wheel 31, the shaft with the worm gear 33 is driven, or the shaft 47 is set in rotation from the eccentric 53. The pump shaft 47 is set in rotation in the following manner: The member 53, the eccentricity of which is adjustable, is rotating in a guide member 54 connected to a pair of rods 55. The rods 55 each have a fork member 56 at one end with which it is fastened to the respective end of two levers 57 and 57' which are provided on both sides of a driving wheel 59 of the pump and which swing around the shaft 47. On a pivot 60 a friction latch 58 and 58' is secured having a wedge-shaped notch which fits into the complementary-shaped circumference of the pump wheel 59. In operation, the rods 55 being moved in the direction of the arrow 63, Fig. 5, the driving wheel 59 of the pump is rotated by the latch members 58 and 58'. The rods 55 moving in the opposite direction of arrow 63, the latch members 58 and 58' exert no pressure on the wheel 59 and thus no rotation takes place. The levers 57', corresponding to the levers 57 but shifted in comparison therewith, have a second friction latch 58' and is driven by one of the rods 55 which is swingingly secured at 54' of the rod 55. It is provided that the range of driving the shaft 47 by the member 58' overlaps slightly the range of driving by the member 58 so that the drive of the pump shaft 47 be interrupted only for so short time that a special lock against the recoil of the pump shaft is not necessary. In any case, such a lock could easily be provided.

Further alterations are possible if several levers having wedge members are driven by different, preferably shiftable rods corresponding to rod 55 which are suitably driven by different cams or eccentrics, the eccentricity of which can be adjusted. It also can be provided that the strokes of the wedge members closely follow each other in order to rotate the driving wheel 59 nearly uniformly. According to the adjustment of the eccentricity of the eccentrics the strokes are smaller or larger and consequently the wheel 59 is rotating in correspondingly smaller or larger steps, i. e. revolves slower or faster.

Figure 6:
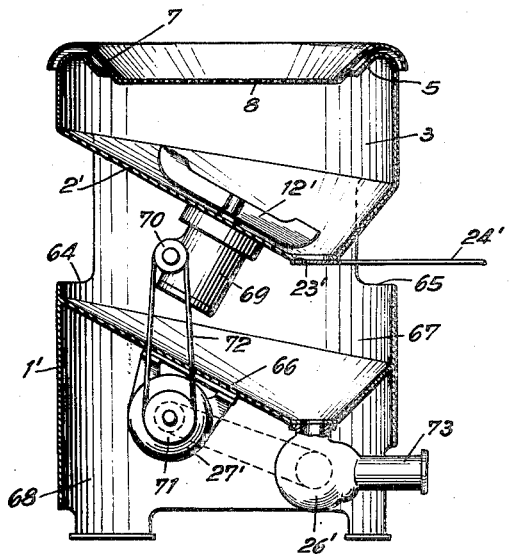
Fig. 6 is a vertical section of a modified construction.

In the construction of Fig. 6 the chamber under the inclined bottom 2' of the mixing chamber 3 is in the essentially cylindrical frame and container casing 1', the latter being divided by a further inclined bottom 66 to form a supply chamber 67 under the bottom surface 2'. The material thoroughly mixed by the propeller 12' is fed through the exit 23' situated at the lowest point of the bottom 2' when the valve 24' is opened. The material then flows into the supply chamber 67 at the lowest point of which is secured the pump 26'.

The frame and container casing 1 has in its upper part cutout portions 64 and 65 by means of which the apparatus can be lifted. In that way, special handles, such as in Fig. 1, are dispensed with. A driving motor 27' is secured in the chamber 68 to the under side of the bottom 66 of the supply chamber. Also, with this example, the same motor drives the propeller 12' as well as the pump 26'. Under the bottom surface 2' there is provided a worm gear 69 to drive the propeller 12', the drive pulley 70 of which is driven by a belt 72 which is preferably separately enclosed on the outer side of the container casing 1', and is driven by a belt pulley 71 secured on a motor shaft.

The conveying tube 73 from the pump projects beyond the outer surface of the frame casing 1' where a hose or tube, not shown, for the conveyance of the materials can easily be attached.

The frame and container casing 1' may be portable or can be set on any desired chassis or frame. In the interior of the mixing chamber there is suitably provided a mixing mark or scale indicating the quantity of a substance to be added to a fixed quantity of another substance, for instance, the quantity of water which must be filled in if another quantity of solid matter is to be added to the container. The inclined bottom itself can, for instance, be arranged so that its highest point serves as a mark.

With the constructions which provide different directions of rotation of the driving motor for different driving functions, two-phase alternators can be used with a possibility of changing the direction of revolution, because a three-phase current is not everywhere available.

When, for the drive of the pump, friction latches are used, these can be so formed that they fit into one or several V-grooves of the driving wheel of the pump instead of fitting into the V-shaped circumference of the driving wheel itself.

The wings of the mixing propeller may suitably consist of and be made of a plastic having great resistance to wear and high elasticity.

To enable the workman handling the nozzle at the end of the supply hose to switch on or to convey the material, there is suitably attached near the nozzle, i. e. at the consuming end of the hose, an electric switch, not shown, for the drive of the pump. In order not to stop the drive for the mixing process, since the mixer is usually attended to by another worker, the construction is so designed that, when changing from mixer drive to pump drive, at first only a preliminary switch is so effected that the switch at the end of the hose has to be set to drive the pump.

Figure 7:
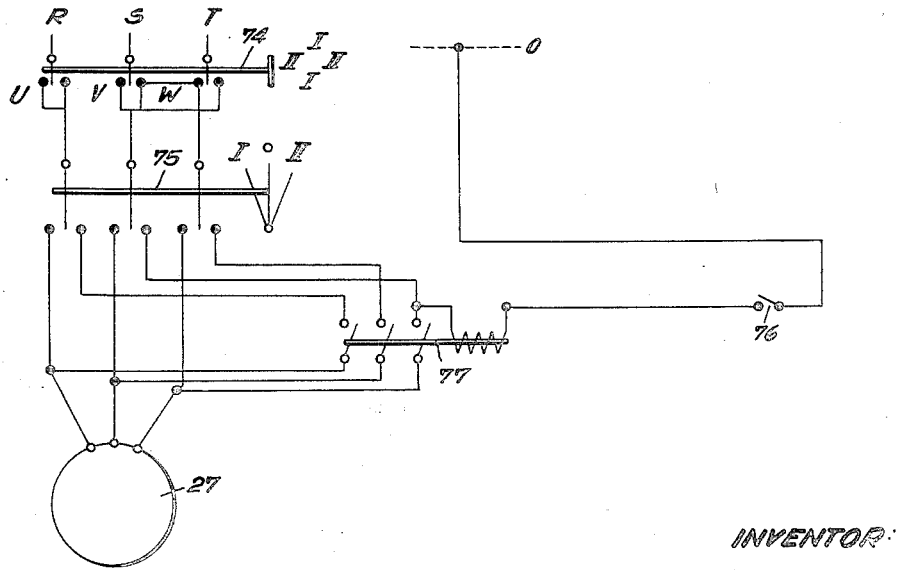
Fig. 7 is a wiring diagram.

A switch 74, Fig. 7, is placed in the circuit of the electric equipment comprising the motor 27 and 27' for the mixer and pump, and the motor for the projecting propeller. In this case, the motor 27 is a three-phase alternating current motor. Therefore, a three-phase switch is necessary. By correct setting of the switch it is also achieved that the motor for the propeller is running in the right direction. Besides the changing switch 74 there is also provided a selecting switch 75 by which the direction of revolution of the driving motor 27 is so selected that either the mixer or the pump is driven, or by which either one motor for the mixer or a separate motor for the pump is switched on. With the construction of Fig. 4 the position II of the selecting switch 75 is the one to enable the operation of the pump. The pump drive however is not yet effective when the selecting switch 75 is moved into position II, but in this position the switch 76 has become effective which is secured on the end of the conveying hose near the nozzle and controls the switch 77 which sets the motor 27 running in the rotational direction desired.

It will be understood from the foregoing that the arrangements discolsed herein are susceptible to considerable variations of construction. Therefore, the embodiments of the invention should be considered as illustrative and not as limiting the scope of the following claims.

I claim:

1. An apparatus for mixing and conveying mortar, plaster and like materials comprising a casing having an open upper rim, a cover for the rim comprising a sieve member and provided with means to agitate the cover to permit the materials to be mixed to be passed through the sieve, a bottom surface secured in the casing and arranged at an angle relative to the horizontal with an exit portion at the lowest part of the bottom surface, said bottom surface forming a mixing chamber above said surface and with the casing and forming a lower chamber under the bottom surface and with the casing, a propeller rotatably mounted in the bottom surface and rotatable in the mixing chamber in a plane parallel to the plane of the bottom surface, a shaft for the propeller projecting through the bottom surface and into the lower chamber, a pump secured to the bottom surface at the exit portion to receive the mixed material and convey it from the apparatus, and means in the lower chamber operatively connected to the propeller shaft and the pump to drive the propeller or the pump or both, said means including an electric alternating reversible motor, the direction of rotation of which may be changed to thereby drive the propeller or the pump as desired, and a transmission unit operatively connected to the shaft and driven by the electric motor including a one-way friction clutch whereby the propeller will cease rotation when the motor is reversed.

2. An apparatus for mixing and conveying mortar, plaster and like mixtures comprising a casing having an open upper rim, a bottom surface secured in the casing and arranged at an angle relative to the horizontal with an exit portion at the lowest part of the bottom surface, said bottom surface spaced from the rim and bottom of the casing to form with the casing a lower chamber under the bottom surface and a mixing chamber with the casing above said surface, a mixing propeller rotatably mounted in the bottom surface and projecting into and rotatable in the mixing chamber by means of a shaft which latter also projects into the lower chamber; a pump mounted in the lower chamber under the exit portion, a motor mounted in the lower chamber to be driven in both directions of rotation, and transmission means connected to the motor, the shaft and the pump and having means so that in one direction of rotation of the motor the shaft and propeller only will be driven and in the other direction the pump will also be driven.

3. An apparatus for mixing and conveying mortar, plaster and like mixtures comprising a casing having an open upper rim, a bottom surface secured in the casing and arranged at an angle relative to the horizontal with an exit portion at the lowest part of the bottom surface, said bottom surface spaced from the rim and bottom of the casing to form with the casing a lower chamber under the bottom surface and a mixing chamber with the casing above said surface, a mixing propeller rotatably mounted in the bottom surface and projecting into and rotatable in the mixing chamber by means of a shaft which latter also projects into the lower chamber, a pump mounted in the lower chamber under the exit portion, a motor mounted in the lower chamber to be driven in both directions of rotation, and transmission means connected to the motor, the shaft and the pump and having means so that in one direction of rotation of the motor the shaft and propeller only will be driven and in the other direction of rotation the pump only will be driven.

4. An apparatus according to claim 2, in which the last-mentioned means includes a one-way friction clutch which when connected with the correct direction of rotation will drive the pump.

5. An apparatus according to claim 3, in which the last-mentioned means includes a cam and a pair of latch members connected with levers to the cam to effect rotation of the pump in one direction of rotation of the motor.

References Cited in the file of this patent

UNITED STATES PATENTS

| Number | Name | Date |
|---|---|---|
| 998,762 | Faller | July 25, 1911 |
| 1,466,639 | Browne | Aug. 28, 1923 |
| 1,493,987 | Kenney | May 13, 1924 |
| 1,506,652 | Maker | Aug. 26, 1924 |
| 1,597,911 | Lomax | Aug. 31, 1926 |
| 2,478,079 | Beasley et al. | Aug. 2, 1949 |

FOREIGN PATENTS

| Number | Country | Date |
|---|---|---|
| 61,738 | Netherlands | Nov. 23, 1946 |
| 114,512 | Sweden | July 10, 1945 |